United States Patent [19]

Hirata

[11] Patent Number: 5,425,844

[45] Date of Patent: Jun. 20, 1995

[54] METHOD OF MAKING LAYER CONTAINING MAGNETIC MATERIAL

[75] Inventor: Osamu Hirata, Hyogo, Japan

[73] Assignee: Kabushiki Kaisha Toshiba, Kawasaki, Japan

[21] Appl. No.: 262,897

[22] Filed: Jun. 21, 1994

[30] Foreign Application Priority Data

| Jun. 23, 1993 | [JP] | Japan | 5-151657 |
| Dec. 27, 1993 | [JP] | Japan | 5-347206 |
| Jun. 8, 1994 | [JP] | Japan | 6-126390 |

[51] Int. Cl.⁶ .................................... H01L 21/3065
[52] U.S. Cl. ..................... 216/22; 437/229; 216/67
[58] Field of Search ............ 437/229; 148/137; 156/628, 643, 659.1, 904; 430/39

[56] References Cited

U.S. PATENT DOCUMENTS

| 3,650,860 | 3/1972 | Rolker | 156/656 |
| 4,292,120 | 9/1981 | Nacci | 156/660 |

OTHER PUBLICATIONS

"The Condensed Chemical Dicitonary", G. Hawley, p. 379, 1977, Van Nostrand & Co.

Primary Examiner—George Fourson
Assistant Examiner—Thomas G. Bilodeau
Attorney, Agent, or Firm—Finnegan, Henderson, Farabow, Garrett & Dunner

[57] ABSTRACT

After forming a magnetic material contained layer on a substrate, a etching region of the magnetic material contained layer is scanned by a magnetic head, to arrange magnetic polarization in one direction. The magnetic material contained layer is separated into a ferro magnetic region which magnetic polarization is arranged in one direction, and a feeble magnetic region which magnetic polarization is not arranged in one direction. Thereafter, the ferro magnetic region is removed by use of a difference between etching rates caused by density of the magnetic fields of these two regions.

10 Claims, 6 Drawing Sheets

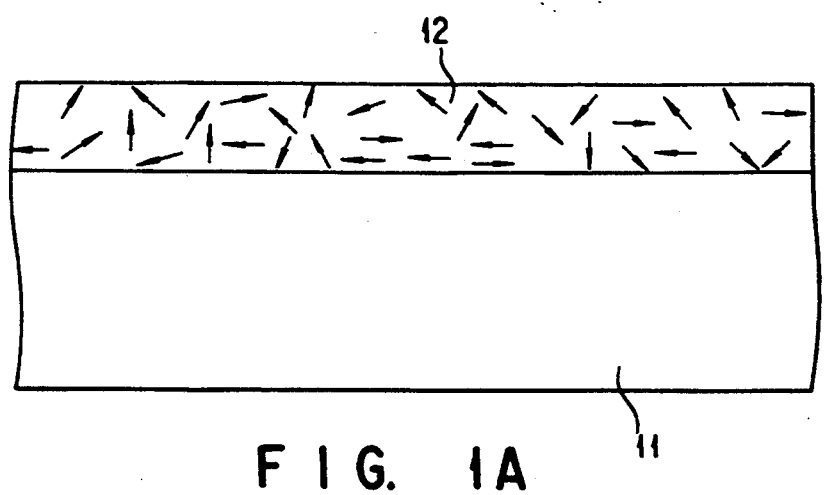
F I G. 1A
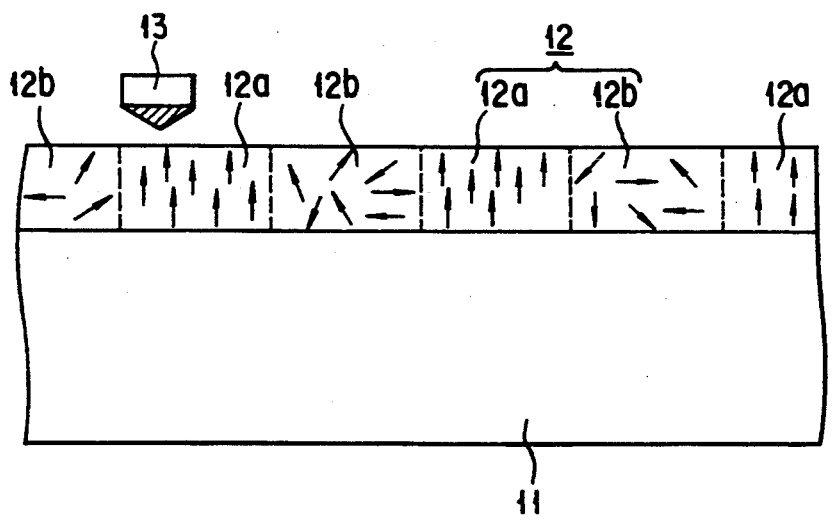
F I G. 1B
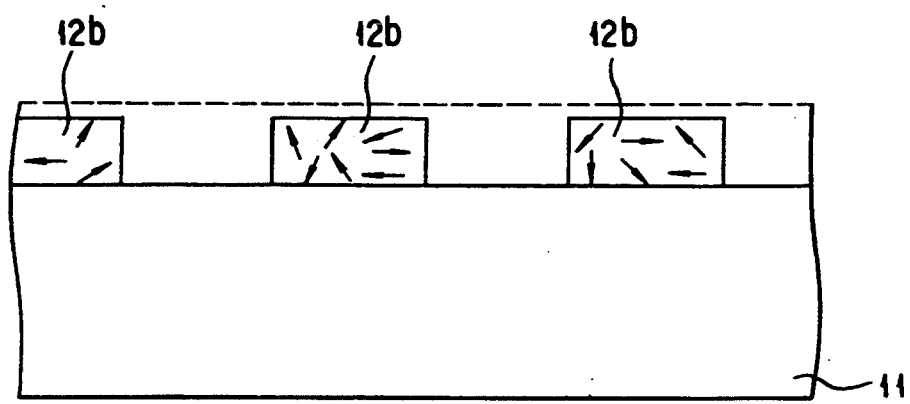
F I G. 1C

METHOD OF MAKING LAYER CONTAINING MAGNETIC MATERIAL

BACKGROUND OF THE INVENTION

1. Field of the Invention

The present invention relates to a method for making a layer containing a magnetic material such as magnetic layers, and more particularly to a method for selectively removing a layer containing a magnetic material without using a mask pattern.

2. Description of the Related Art

Etching of a magnetic material contained layer will be explained with reference to FIG. 4.

As shown in FIG. 4A, a magnetic material contained layer 102 is formed on a substrate 101 to have a film thickness of about 1 μm by a magnetron sputtering device. Thereafter, a resist is applied to the magnetic material contained layer 102, and lithograph and developing treatments are provided to the resist, thereby forming a resist pattern 103.

As shown in FIG. 4B, the resist pattern 103 is used as a mask, and the magnetic material contained layer 102 is etched by RIE (Reactive Ion Etching), thereby forming magnetic material contained layers 102a to 102c. The process conditions, are given as follows, an etching gas: $SiCl_4/N_2/Cl_2/NH_3$, and a temperature: about 250° C. At this case, since the magnetic material contained layer 102 is composed of a difficult-etch material, a selection ratio of the magnetic material contained layer 102 to the resist pattern 103 is 1 or less. Therefore, the resist pattern 103 is etched at the same time when the magnetic material contained layer 102 is etched. As a result, the film thickness of the resist pattern 103 is largely thinned.

Then, as shown in FIG. 4C, the resist pattern 103 is removed by ashing or a resist release agent.

As mentioned above, the magnetic material contained layer 102 is etched with the resist pattern 103 serving as a mask. In this time, since the selection ratio is 1 or less, it is required that the thickness of the resist pattern 103 be formed about ten times that of the magnetic material contained layer 102. However, if the thickness of the resist pattern 103 is set to 10 μm, the resist pattern 103 is not sufficiently exposed in a direction of the thickness, and there is a case that a resist pattern 103a is left on a predetermined etching area (FIG. 5).

Furthermore, when the magnetic material contained layer 102 is etched with the resist pattern 103 including the resist pattern 103a serving as a mask, there is a case that etching residual 102′ is generated. First, the resist pattern 103a and the resist pattern 103 are etched. Sequentially, the residual resist pattern 103 is used as a mask, and the magnetic material contained layer 102 is etched. At this time, the resist pattern 103 and the magnetic material contained layer 102 are simultaneously etched, the film thickness of the resist pattern 103 becoming thinner than the film thickness which is originally necessary for the mask. As a result, the resist pattern 103 does not serve as a mask, and the etching residual 102′ is generated.

Moreover, the resist pattern 103 is etched not only in the up and down direction but also in the right and left direction. Due to this, as shown in FIG. 4C, the magnetic material contained layers 102a to 102c are formed in a tapering shape. The length $L_1$ between upper portions of adjacent magnetic material contained layers 102a and 102b is 4.1 μm, and the length $L_2$ between bottom portions of adjacent magnetic material contained layers 102a and 102b is 2.5 μm. An etching anisotropy is extremely bad.

By the way, for forming a semiconductor device, a planarization technique of an interlevel insulator is important. As a circuit element formed on a semiconductor substrate is made fine, the surface becomes uneven. Due to this, in forming a multilevel wiring layer, it is needed that breaking of wire at the uneven portion be reduced. As one of the planarization techniques, there is an etch back method.

The etch back method will be explained with reference to FIG. 7. A conductive layer 113 is formed on an insulating film 112 formed on a semiconductor substrate 111. Thereafter, an interlevel insulator 114 is formed on the entire surface. Thereafter, resist 115 is applied on the entire surface to smooth the surface (FIG. 7A).

By use of plasma etching, the resist 115 and the interlevel insulator 114 are etched. At this time, etching conditions are set such that the etching speed of resist 115 and that of the interlevel insulator 114 are the same. For example, as an etching gas, mixed gas of F gas and $O_2$ gas is used. First, the resist 115 is evenly etched, and a projected portion of the interlevel insulator 114 is exposed (FIG. 7B).

Then, the interlevel insulator 114 and the resist 115 are simultaneously etched. At this time, when the interlevel insulator 114 is etched, $O_2$ gas is generated. Due to this, a ratio of the etching gas changes. As a result, as compared with the interlevel insulator 114, the etching speed of the resist 115 becomes fast, a difference in level is generated on the surface of the etched interlevel insulator 114 (FIG. 7C).

As mentioned above, even in a case that the selection ratio of the resist 115 and the interlevel insulator 114 as such is set to be the same, the substantial selection ratio is changed by the conductive pattern, that is, the shape of the interlevel insulator 114. Due to this, it is difficult to set suitable etching conditions.

Also, as shown in FIG. 8, if adjacent conductive layers 113 are formed in a separating shape, there is a case that resist 115 is little applied on the projected portion of the interlevel insulator 114. In this case, as compared with the case of FIG. 7, the ratio of etching gas is largely changed, the difference in level on the surface of the etched interlevel insulator 114 is increased.

As mentioned above, in the etching method of the magnetic material contained layer, since the magnetic material contained layer as such is composed of the difficult-etch material, the selectivity between the magnetic material contained layer and the etching mask worsens, and it is difficult for the magnetic material contained layer to be formed to a predetermined size.

Moreover, if there is a difference in level on the interlevel insulator after the interlevel insulator on the semiconductor substrate is etched, there is a case that breaking of wire occurs in the conductive layer formed on the interlevel insulator. Due to this, it is needed that the interlevel insulator be further planarized. However, since the etching condition differs for every conductive pattern, and the conductive pattern differs every type, it is difficult for the etching condition to be suitably set.

SUMMARY OF THE INVENTION

A first object of the present invention is to provide a method for etching a magnetic material contained layer.

A second object of the present invention is to provide a method for etching a magnetic material contained layer having a good etching anisotropy.

A third object of the present invention is to provide a method for etching a magnetic material contained layer in which no etching residual is generated.

A fourth object of the present invention is to provide a method for making a semiconductor device in which an interlevel insulator is planarized without having influence of a conductive pattern of a ground.

According to one aspect of the present invention, there is provided a method for etching a magnetic material contained layer comprising the steps of forming a magnetic material contained layer on a substrate; arranging magnetic polarization of an etching region of the magnetic material contained layer in one direction by a magnetic head; and selectively etching the etching region.

According to another aspect of the present invention, there is provided a method for making a semiconductor device, comprising the steps of forming an insulating film having a projected portion on a semiconductor substrate; forming a magnetic material contained layer on the insulation film; arranging magnetic polarization of a region of the magnetic material contained layer, formed on the projected portion of the insulating film in one direction by a magnetic head; and selectively dry-etching the magnetic material contained layer and the insulating film.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings in which:

FIGS. 1A to 1C are cross-sectional views of processes showing a first embodiment of the present invention;

DETAILED DESCRIPTION OF THE PREFERRED EMBODIMENTS

Figure 2A:
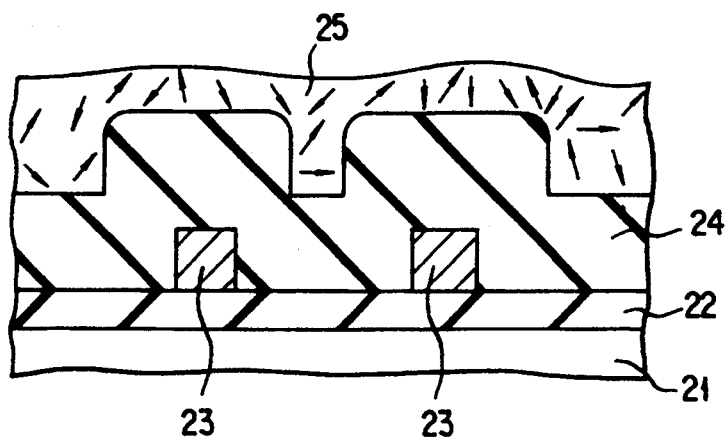
FIGS. 2A to 2D are cross-sectional views of processes showing a second embodiment of the present invention.

The following will explain a method for etching a magnetic layer contained, e.g., a layer containing a magnetic material to be used in various electronic components such as a semiconductor device according to the present invention with reference to the drawings.

FIG. 1 explains a first embodiment of the present invention. The first embodiment relates to etching of a magnetic material contained layer. As shown in FIG. 1A, a magnetic material contained layer 12, which is composed of e.g., ferrite, is formed on a substrate 11 to have a film thickness of about 1.0 $\mu$m by use of a magnetron sputtering device. The substrate 11 is a substrate not containing a magnetic material, such as a semiconductor substrate, an insulating substrate and a resin substrate. In the figure, arrows show directions of a magnetic polarization of a magnetic material, and the magnetic polarization in the magnetic material contained layer 12 is not arranged in one direction.

As shown in FIG. 1B, a magnetic head 13, which can be scanned back and forth and right and left, is set close to predetermined etching region of the magnetic material contained layer 12. Then, the magnetic polarization in the predetermined etching region are uniformly arranged in one direction at a magnetic field of about $8 \times 10^{-2}$ T[tesla]. Thereby, the magnetic material contained layer 12 is separated into two types of regions, that is, a ferro magnetic region 12a where the magnetic polarization is arranged in one direction, and a feeble magnetic region 12b where the magnetic polarization is not arranged. The magnetic moment of the ferro magnetic region 12a is set to be larger than that of the feeble magnetic region 12b.

Then, as shown in FIG. 1C, the ferro magnetic region 12a of the magnetic material contained layer 12 is removed by plasma etching. The plasma etching will be specifically explained as follows. For example, the etching conditions are given as follows, an etching gas: $SiCl_4/Cl_2/NH_3=60/20/35$ [SCCM], and a pressure: 40 [Torr].

The above etching gas is introduced into a plasma chamber and a microwave is generated from a waveguide, and a glow discharge occurs. At this time, in the ferro magnetic region 12a, the directions of the magnetic polarization are uniformly arranged, so that the magnetic field is voluntarily generated.

When a rotation of an electron due to the magnetic field conforms to the frequency of the microwave, the electron generates cyclotron resonance, energy of the microwave is absorbed, and the electron is accelerated. The accelerated electron collides with gas molecular, ionized, and plasma having high density is generated. Then, excess electrons are brought about on an electrode by the plasma. An applied voltage is generated in order to cancel the electric charges of the excess electrons. The voltage accelerates etching gas, which is ionized, and etching is performed.

In other words, the higher the density of plasma is, the more the acceleration of ionized etching gas is improved, so that the etching rate is improved. The plasma having high density is generated in the portion where the electron generates the cyclotron resonance. The portion where the cyclotron resonance occurs is the ferro magnetic region 12a, which voluntarily generates the magnetic field. As a result, the etching speed of the ferro magnetic region 12a is twice to three times faster than that of the feeble magnetic region 12b.

Therefore, when the magnetic material contained layer 12, formed of the ferro magnetic region 12a and the feeble magnetic region 12b, is plasma-etched, the ferro magnetic region 12a and the feeble magnetic region 12b are started to be etched simultaneously. However, since the etching speed of the ferro magnetic region 12a is twice to three times faster than that of the feeble magnetic region 12b, the ferro magnetic region 12a can be selectively etched. The dotted-line portion of FIG. 1C shows the shape of the magnetic material contained layer 12 before the etching is performed. It is understood that the feeble magnetic region 12b is slightly etched.

A second embodiment of the present invention will be explained with reference to FIG. 2.

The second embodiment explains a method for etching back the interlevel insulator on the semiconductor substrate by use of a magnetic material contained resist layer.

As shown in FIG. 2A, a conductive layer 23 is formed on an insulating film 22 of a semiconductor substrate 21. Thereafter, an interlevel insulator (such as P-SiO, TEOS, etc.) having a thickness of 1.5 μm is formed on the entire surface. Thereafter, a magnetic material contained resist layer 25 having a thickness of 0.5 μm is formed on the interlevel insulator 24. The magnetic material contained resist layer 25 is coated on the interlevel insulator 24, so that the surface of the magnetic material contained resist layer 25 is smoothly shaped. In the figure, arrows show directions of the magnetic polarization of a magnetic material, and the magnetic polarization is not arranged in one direction.

Figure 2B:
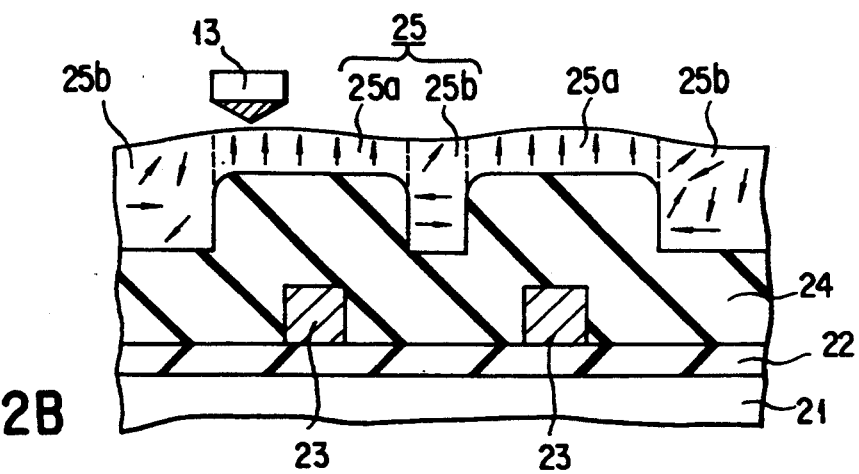

As shown in FIG. 2B, the surface of the magnetic material contained resist layer 25 on a projected portion of the interlevel insulator 24 is scanned by the magnetic head 13, and the magnetic polarization are arranged in one direction. Thereby, the magnetic material contained resist layer 25 is formed of two types of regions, that is, a ferro magnetic region 25a where the directions of the magnetic polarization are uniformly arranged, and a feeble magnetic region 25b where the directions of the magnetic polarization are not arranged.

Figure 2C:
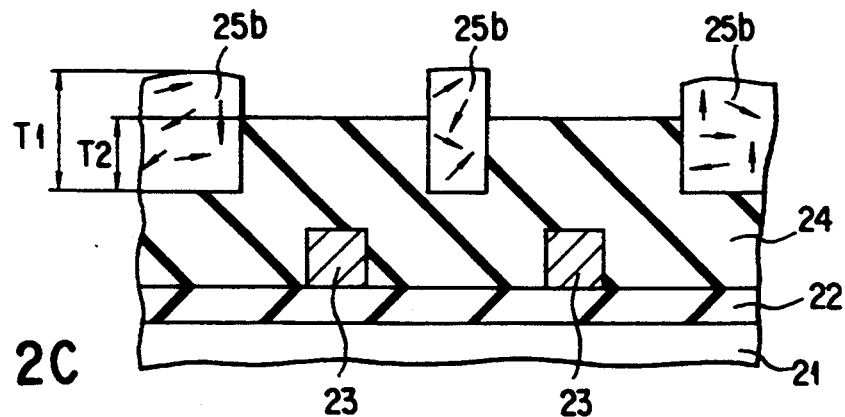

Then, as shown in FIG. 2C, the etch back is performed by the plasma etching. For example, the etching conditions are given as follows, an etching gas: $CHF_3/CF_4/O_2=40/20/50$ [SCCM], a pressure: 1.8 [Torr], and a power: 500 [W].

First, the magnetic material contained resist layer 25 is etched. Here, by the same phenomenon as the case of the first embodiment, electronic cyclotron resonance occurs on the ferro magnetic region 25a, and density of plasma of the ferro magnetic region 25a is higher than that of the feeble magnetic region 25b. Therefore, the etching speed of the ferro magnetic region 25a is about 1.4 times faster than that of the feeble magnetic region 25b. Thereby, the ferro magnetic region 25a is removed, and the surface of the projection portion of the interlevel insulator 24 is exposed. On the other hand, feeble magnetic region 25b is removed only about 70% of the ferro magnetic region 25a.

Sequentially, if the plasma etching advances, the feeble magnetic region 25b is etched. At the same time, the etching of the convex portion of the interlevel insulator 24 is etched. If the interlevel insulator 24 is etched, $O_2$ gas is generated, so that an etching gas is set such that the etching speed of the magnetic material contained resist layer 25 and that of the interlevel insulator 24 are the same. However, due to the increase of $O_2$ gas, the etching speed of the magnetic material contained resist layer 25 becomes faster than that of the interlevel insulator 24.

Figure 2D:
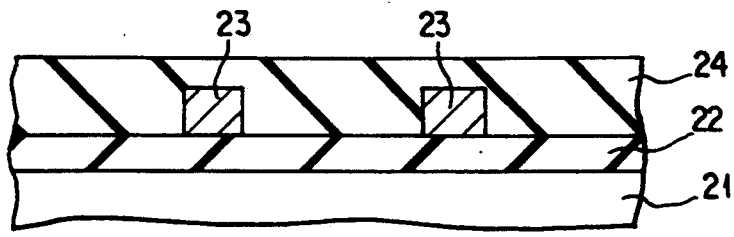

However, as shown in FIG. 2C, at the time of generation of $O_2$ gas, the relationship between the etching quantity (level) of the feeble magnetic region 25b ($T_1$) and the etching quantity of the projected portion of the interlevel insulator 24 ($T_2$) is $T_1 > T_2$. Therefore, since etching speed of the feeble magnetic region 25b is faster than that of the projected portion of the interlevel insulator 24, the end of etching of the feeble magnetic region 25b and that of the projected portion of the interlevel insulator 24 can be set to be the same. Thereby, as shown in FIG. 2D, the interlevel insulator 24 can be planarized without having influence of the conductive layer 23.

A third embodiment of the present invention will be explained with reference to FIG. 3. The third embodiment explains a method for etching back the interlevel insulator on the semiconductor substrate by use of a spin on glass (SOG) layer containing a magnetic material. In this case, only the portions which are different from the second embodiment, will be explained in the third embodiment.

Figure 3A:
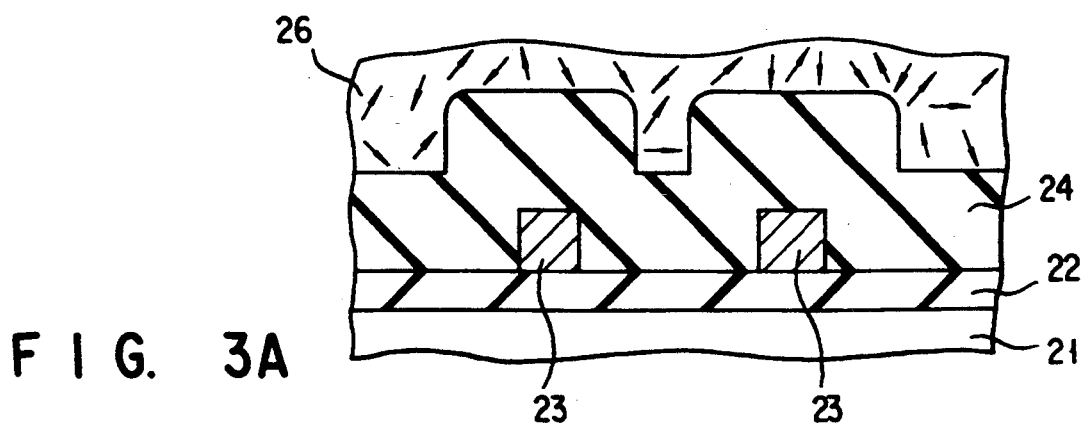
FIGS. 3A to 3D are cross-sectional views of processes showing a third embodiment of the present invention.

As shown in FIG. 3A, a magnetic material contained SOG layer 26 formed on the interlevel insulator 24 to have a thickness of 0.5 μm. The magnetic material contained SOG layer 26 is coated on the interlevel insulator 24. The surface of the magnetic material contained SOG layer 26 is smoothly shaped, and the magnetic polarization of the magnetic material is not arranged in one direction.

Figure 3B:
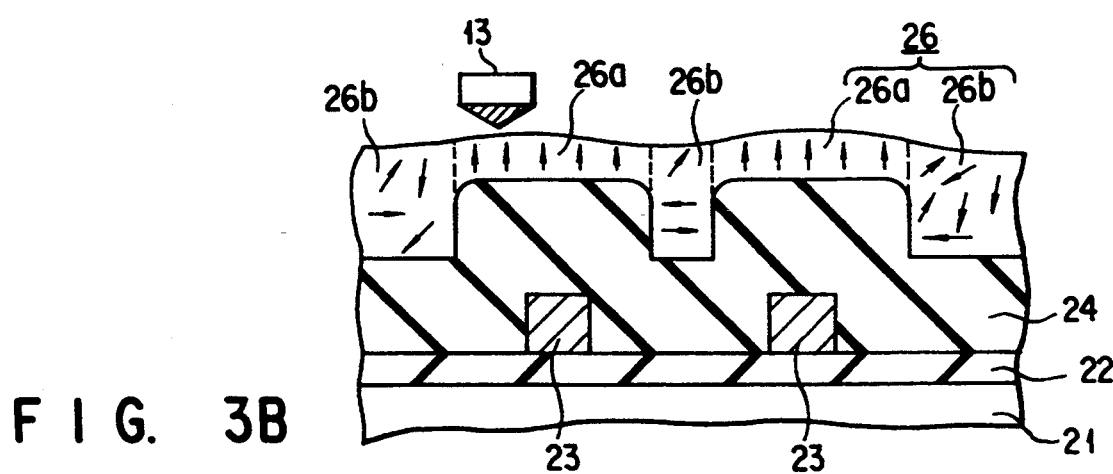

As shown in FIG. 3B, the surface of the magnetic material contained SOG layer 26 on a projected portion of the interlevel insulator 24 is scanned by the magnetic head 13, and the magnetic polarization of the magnetic material are arranged in one direction. Thereby, the magnetic material contained SOG layer 26 is formed of two types of regions, that is, a ferro magnetic region 26a where the directions of the magnetic polarization are uniformly arranged, and a feeble magnetic region 26b where the directions of the magnetic polarization are not arranged.

Figure 3C:
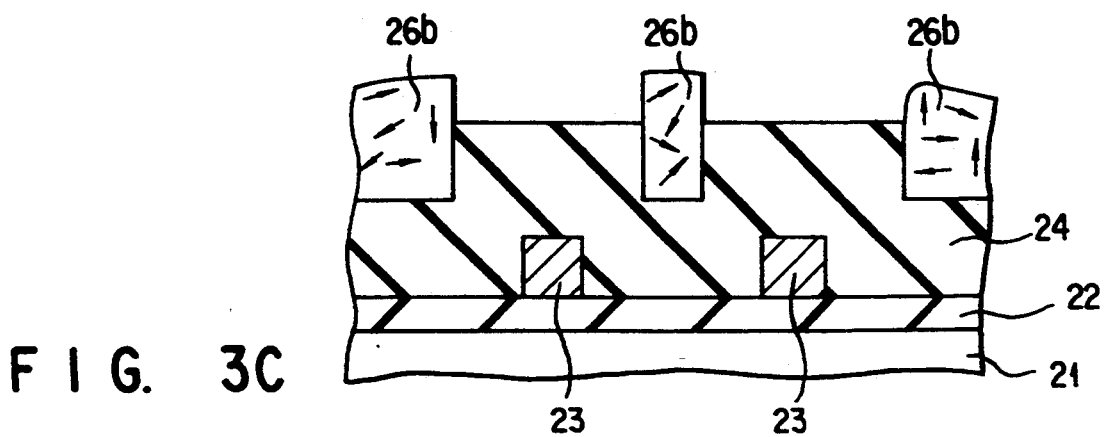

As shown in FIG. 3C, the etch back is performed by the plasma etching. For example, the etching conditions are given by an etching gas: $CHF_3/CF_4/O_2=40/10/50$ [SCCM], a pressure: 1.8 [Torr], and a power: 500 [W].

First, the magnetic material contained SOG layer 26 is etched. Similar to the second embodiment, density of plasma of the ferro magnetic region 26a is higher than that of the feeble magnetic region 26b. Therefore, the etching speed of the ferro magnetic region 26a is faster than that of the feeble magnetic region 26b. Thereby, the ferro magnetic region 26a is removed, and the surface of the projected portion of the interlevel insulator 24 is exposed. On the other hand, the feeble magnetic region 26b is left in a projected shape.

Sequentially, if plasma-etching advances, the feeble magnetic region 26b is etched. At the same time, the etching of the projected portion of the interlevel insulator 24 is etched. When the interlevel insulator 24 is etched, $O_2$ gas is generated, so that a ratio of $O_2$ gas to etching gas changes. Originally, etching gas is set such that the etching speed of the magnetic material contained SOG layer 26 and that of the interlevel insulator 24 are the same. However, due to the increase of $O_2$ gas, the etching speed of the magnetic material contained SOG layer 26 becomes faster than that of the interlevel insulator 24.

Figure 3D:
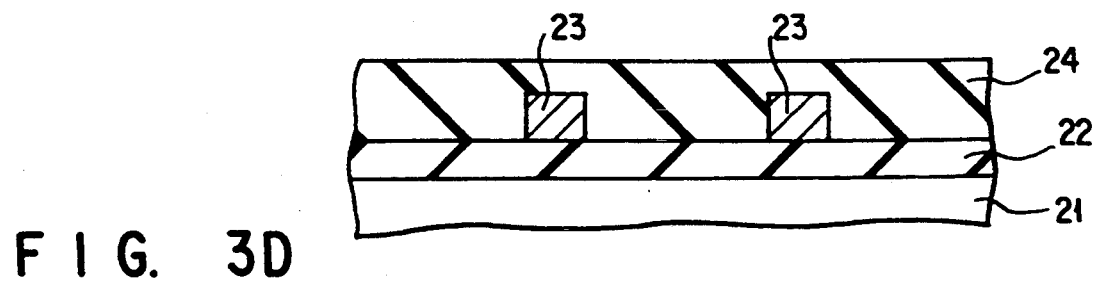
Figure 4A:
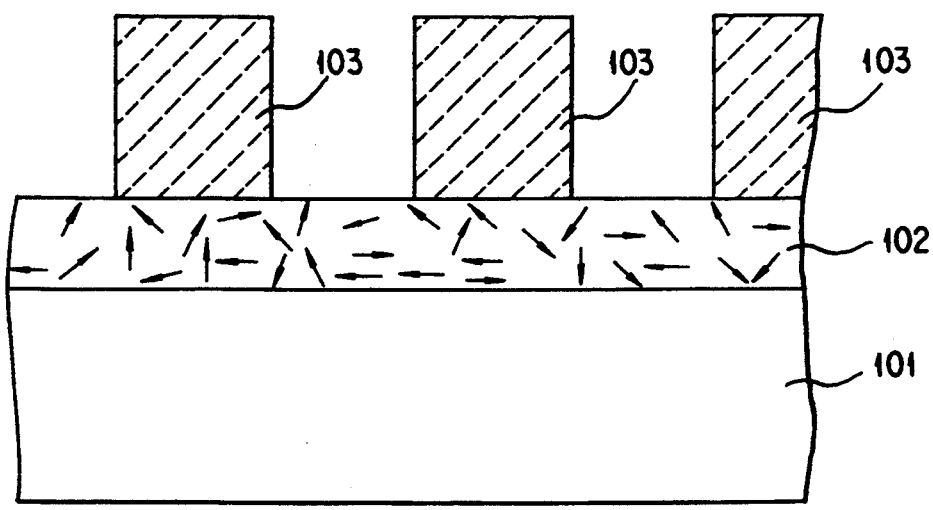
FIGS. 4A to 4C are cross-sectional views of process showing a conventional etching method of a magnetic material contained layer.
Figure 4B:
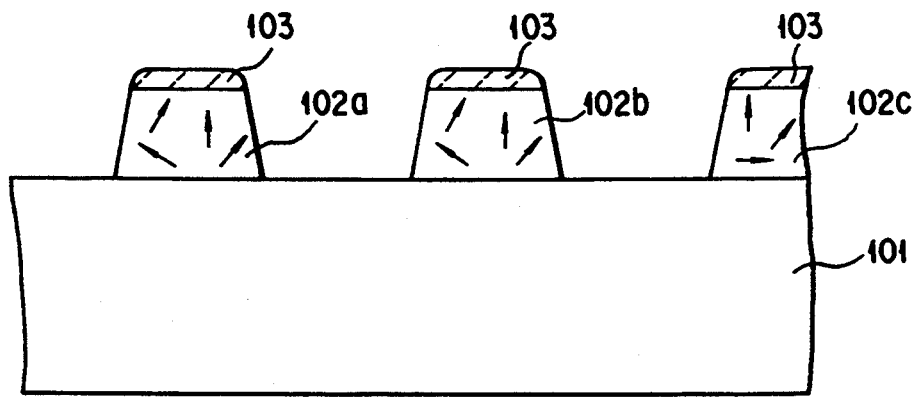
Figure 4C:
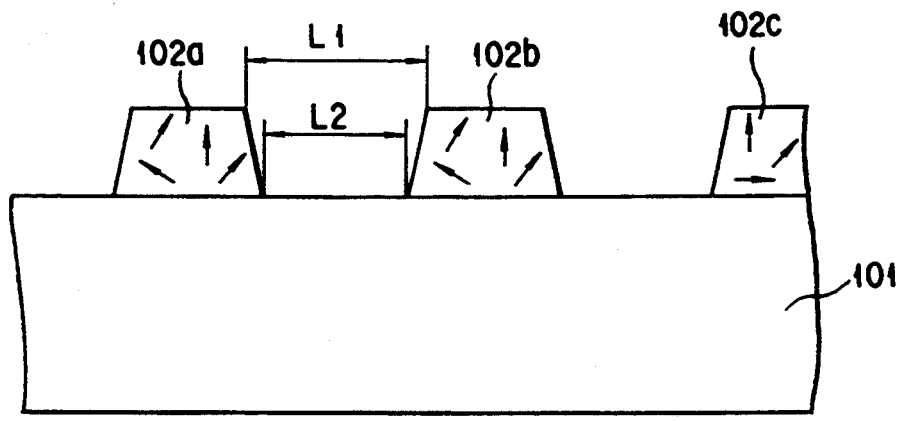
Figure 5:
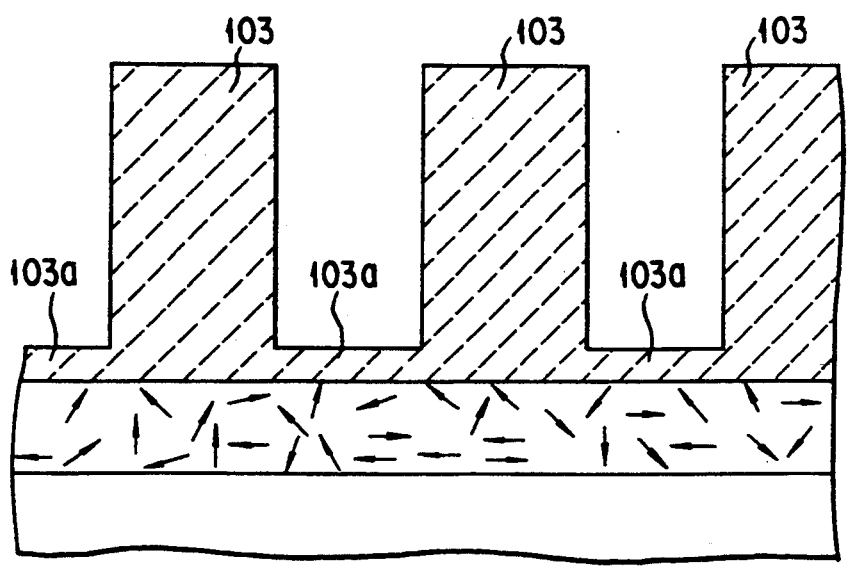
FIG. 5 is a cross-sectional view showing a state that resolution of lithography worsens in conventionally forming a resist pattern.
Figure 6:
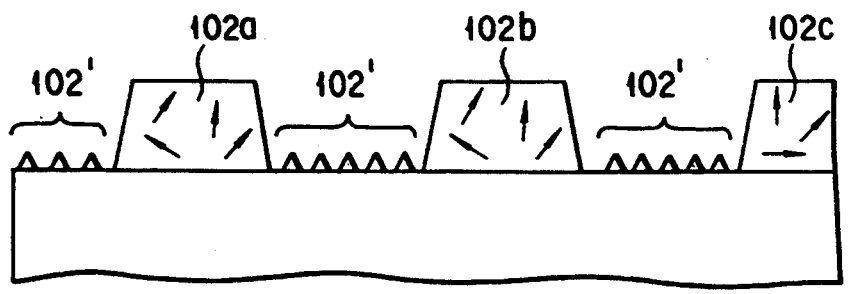
FIG. 6 is a cross-sectional view showing a state that etching residual is generated in conventional.
Figure 7A:
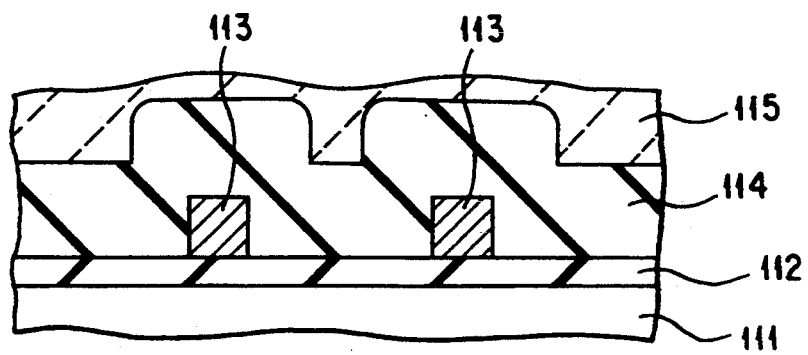
FIGS. 7A to 7C are cross-sectional views of processes showing a conventional etch back method of an interlevel insulator.
Figure 7B:
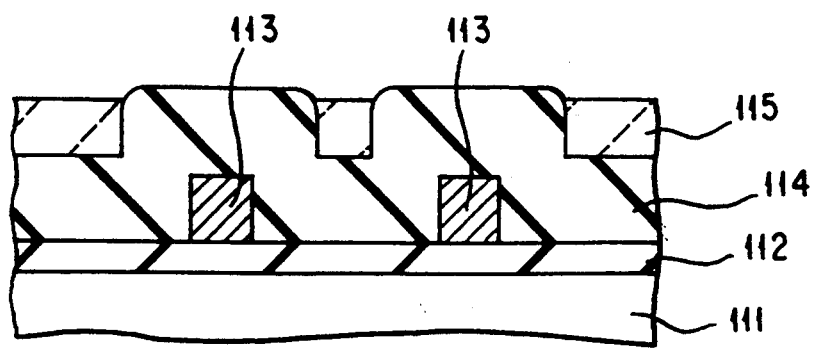
Figure 7C:
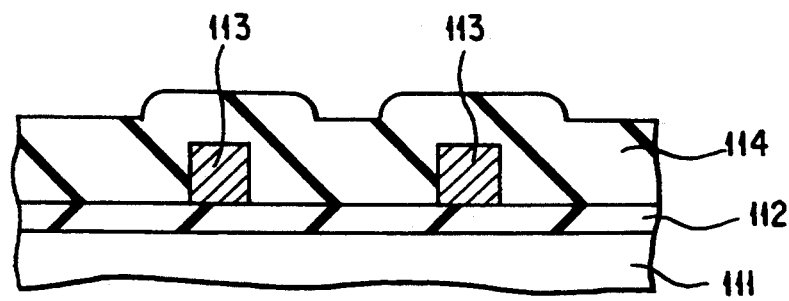
Figure 8:
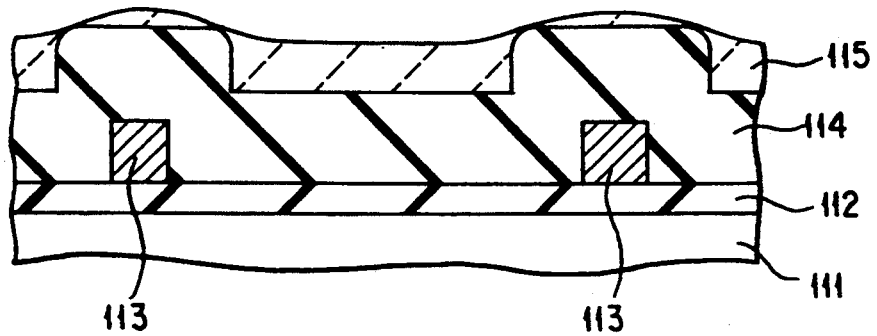
FIG. 8 is a cross sectional view showing a shape of resist formed in a case that a distance between conductive layers is large.

However, as shown in FIG. 3C, at the time of generation of $O_2$ gas, since the level of the surface of the feeble magnetic region 26b is higher than that of the surface of the interlevel insulator 24, thereby the end of etching of the feeble magnetic region 26b and that of the projected portion of the interlevel insulator 24 can be set to be the same. As shown in FIG. 3D, the interlevel insulator 24 can be planarizaed without having influence of the conductive layer 23.

As material used in the magnetic material contained layer 12 of the first embodiment, the magnetic material contained resist layer 25 of the second embodiment, and the magnetic material contained SOG layer 26 of the third embodiment, there is used ferrite ($\alpha O \cdot Fe_2O_3$: $\alpha =$ dihydric metal such as Mn, Fe, Co, Ni, Cu, Zn, Mg, Cd, etc.) The magnetic material is not limited to ferrite. Any material will be used if the material serves as a magnetic material.

According to the present invention, in etching the magnetic material contained layer to be used in various electronic components such as a semiconductor device, it is unnecessary to use the mask pattern. Due to this, it is possible to omit a lithography process, which is conventionally needed to form the mask pattern. Also, the etching residual is little generated, and anisotropy of etching can be largely improved.

Moreover, the resist containing a magnetic material or SOG is used in etching back the interlevel insulator, thereby making it possible to perform etch back in accordance with the shape of the projected portion of the interlevel insulator. Conventionally, it was difficult to set the etching conditions in accordance with the shape of the projected portion since the shape of the projected portion differed depending on the conductive pattern of the ground. However, according to the present invention, etch back can be performed to be suitable for the shape of the projected portion only by scanning the projected portion by the magnetic head.

It is further understood by those skilled in the art that the foregoing description is only of the preferred embodiments and that various changes and modifications may be made in the invention without departing from the spirit and scope thereof.

What is claimed is:

1. A method for making a magnetic material contained layer, comprising the steps of:
   providing a substrate;
   forming a magnetic material containing layer on said substrate;
   arranging magnetic polarization of at least one etching region of said magnetic material contained layer in one direction by use of magnetic head scanning; and
   selectively removing said magnetic material contained layer from said etching region by use of plasma etching.

2. A method for making a magnetic material contained layer, comprising the steps of:
   providing a substrate;
   forming a magnetic material containing layer on said substrate, said magnetic material contained layer being composed of a single magnetic layer;
   arranging magnetic polarization of an etching region of said magnetic material contained layer in one direction; and
   selectively removing said magnetic material contained layer from said etching region by use of plasma etching.

3. The method according to claim 1, wherein a magnetic moment of said etching region is larger than that of regions of said magnetic material contained layer other than said etching region.

4. The method according to claim 1, wherein said magnetic material is ferrite.

5. A method for etching a magnetic material contained layer; comprising the steps of:
   providing a substrate;
   forming a magnetic material contained layer on said substrate;
   applying a magnetic field to at least an etching region of said magnetic contained layer to increase a magnetic moment of said etching region; and
   selectively removing said magnetic material contained layer from said etching region by use of plasma etching.

6. A method for making a semiconductor device, comprising the steps of:
   providing a semiconductor substrate;
   forming an insulator having a projected portion on said semiconductor substrate;
   forming a magnetic material contained layer on said insulator;
   arranging magnetic polarization of a region of said magnetic material contained layer, formed on said projected portion of said insulator in one direction by magnetic head scanning; and
   removing said magnetic material contained layer and a surface portion of said insulator by use of plasma etching so that said insulator has a planar surface.

7. A method for making a semiconductor device, comprising the steps of:
   providing a semiconductor substrate;
   forming an insulator having a projected portion on said semiconductor substrate;
   forming a magnetic material contained layer on said insulator;
   arranging magnetic polarization of a region of said magnetic material contained layer, formed on said protected portion of said insulator in one direction; and
   selectively removing said magnetic material contained layer and said insulator by use of plasma etchings, said magnetic material contained layer being completely removed to planarize said insulator.

8. A method for making a semiconductor device, comprising the steps of:
   providing a semiconductor substrate;
   forming an insulator having a projected portion on said semiconductor substrate;
   forming a magnetic material contained layer on said insulator;
   arranging magnetic polarization of a region of said magnetic material contained layer, formed on said projected portion of said insulator in one direction, wherein a surface of said magnetic material contained layer on said projected portion of said insulator is scanned by a magnetic head to arrange magnetic polarization in one direction; and
   selectively removing said magnetic material contained layer and said insulator by use of plasma etching.

9. A method for making a semiconductor device, comprising the steps of:
   providing a semiconductor substrate;
   forming an insulator having a projected portion on said semiconductor substrate;
   forming a magnetic material contained layer on said insulator, said magnetic material contained layer being composed of a magnetic material contained resist layer;

arranging magnetic polarization of a region of said magnetic material contained layer, formed on said projected portion of said insulator in one direction; and selectively removing said magnetic material contained layer and said insulator by use of plasma etching.

10. A method for making a semiconductor device, comprising the steps of:

providing a semiconductor substrate;

forming an insulator having a projected portion on said semiconductor substrate;

forming a magnetic material contained layer on said insulator, said magnetic material contained layer being composed of a magnetic material contained SOG layer;

arranging magnetic polarization of a region of said magnetic material contained layer, formed on said projected portion of said insulator in one direction; and selectively removing said magnetic material contained layer and said insulator by use of plasma etching.

* * * * *

UNITED STATES PATENT AND TRADEMARK OFFICE
CERTIFICATE OF CORRECTION

PATENT NO. : 5,425,844
DATED : June 20, 1995
INVENTOR(S) : Osamu HIRATA

It is certified that error appears in the above-indentified patent and that said Letters Patent is hereby corrected as shown below:

Claim 5, Column 8, Line 2, "layer;" should read
--layer,--.

Claim 7, Column 8, Line 40, "etchings" should read
--etching--.

Abstract, Line 2, "a" should read --an--.

Abstract, Lines 5, 6 & 9 "ferro magnetic" should
read --ferromagnetic--.

Abstract, Lines 6 & 8, "which" should read
--in which--.

Signed and Sealed this

Thirtieth Day of January, 1996

Attest:

BRUCE LEHMAN

Attesting Officer

Commissioner of Patents and Trademarks